(12) United States Patent
Stangl

(10) Patent No.: US 7,096,104 B2
(45) Date of Patent: Aug. 22, 2006

(54) CONTROL UNIT FOR A LOAD

(75) Inventor: Herbert Stangl, Csokorcasse (AT)

(73) Assignee: Siemens Aktiengesellschaft, Munich (DE)

( * ) Notice: Subject to any disclaimer, the term of this patent is extended or adjusted under 35 U.S.C. 154(b) by 834 days.

(21) Appl. No.: 10/210,654

(22) Filed: Aug. 1, 2002

(65) Prior Publication Data

US 2003/0028300 A1    Feb. 6, 2003

(30) Foreign Application Priority Data

Aug. 1, 2001  (DE) ............................... 101 37 578

(51) Int. Cl.
*E05F 15/00* (2006.01)
*G05D 3/00* (2006.01)
*G06F 17/00* (2006.01)
*G06F 7/00* (2006.01)

(52) U.S. Cl. ........................ 701/49; 701/31; 714/48; 714/814; 714/815; 327/594; 307/10.1; 307/139; 340/825.57; 340/309.5; 340/309.8; 700/14; 700/21; 700/79

(58) Field of Classification Search ............ 700/12–14, 700/21, 79, 296–298; 713/320–324, 300; 361/195; 307/38–41, 139–141, 141.4, 141.8; 714/22–24, 14, 1, 2, 30, 37, 48, 55, 56, 703, 714/799, 814, 815; 701/36, 49, 29, 31; 323/299; 340/309.16, 309.4, 309.5, 309.8, 825.57, 340/531, 532; 327/594
See application file for complete search history.

(56) References Cited

U.S. PATENT DOCUMENTS

| | | | | |
|---|---|---|---|---|
| 4,924,169 A | * | 5/1990 | Shifflet et al. ............... 320/112 |
| 5,239,520 A | * | 8/1993 | Arnold ......................... 368/10 |
| 5,305,459 A | * | 4/1994 | Rydel .......................... 713/323 |
| 5,744,874 A | * | 4/1998 | Yoshida et al. ............. 307/10.1 |
| 5,835,025 A | * | 11/1998 | Zufelt et al. ........... 340/870.02 |
| 6,028,537 A | * | 2/2000 | Suman et al. ................ 340/988 |
| 6,104,185 A | * | 8/2000 | Lamm et al. ............. 324/207.2 |
| 6,198,913 B1 | * | 3/2001 | Sung et al. ............... 455/343.3 |
| 6,252,406 B1 | * | 6/2001 | Tegge et al. ................. 324/427 |
| 6,393,571 B1 | * | 5/2002 | Huckfeldt et al. ........... 713/320 |
| 6,438,462 B1 | * | 8/2002 | Hanf et al. .................. 700/297 |
| 6,463,543 B1 | * | 10/2002 | Alvarez ....................... 713/323 |
| 6,509,767 B1 | * | 1/2003 | Tanaka et al. ............... 327/142 |
| 6,738,914 B1 | * | 5/2004 | Christopher ................. 713/323 |
| 6,747,498 B1 | * | 6/2004 | Pauletti et al. ............... 327/198 |
| 2001/0054967 A1 | * | 12/2001 | Vanderah et al. ........... 340/626 |
| 2003/0233156 A1 | * | 12/2003 | Pihet et al. .................... 700/79 |
| 2005/0088206 A1 | * | 4/2005 | Koch ............................ 327/77 |

FOREIGN PATENT DOCUMENTS

JP    2002108519 A  *  4/2002

* cited by examiner

*Primary Examiner*—Anthony Knight
*Assistant Examiner*—Crystal J. Barnes
(74) *Attorney, Agent, or Firm*—Baker Botts L.L.P.

(57) ABSTRACT

Control unit for a load, in particular for a sliding sunroof control of a vehicle, having a microprocessor and having an integrated voltage regulator for generating the supply voltage of the microprocessor from the battery voltage of an on-board battery, in which case, in order to switch on the microprocessor the latter is fed its supply voltage by means of a wake-up pulse for a predetermined switch-on duration and said supply voltage is maintained as long as the microprocessor outputs trigger signals.

12 Claims, 1 Drawing Sheet

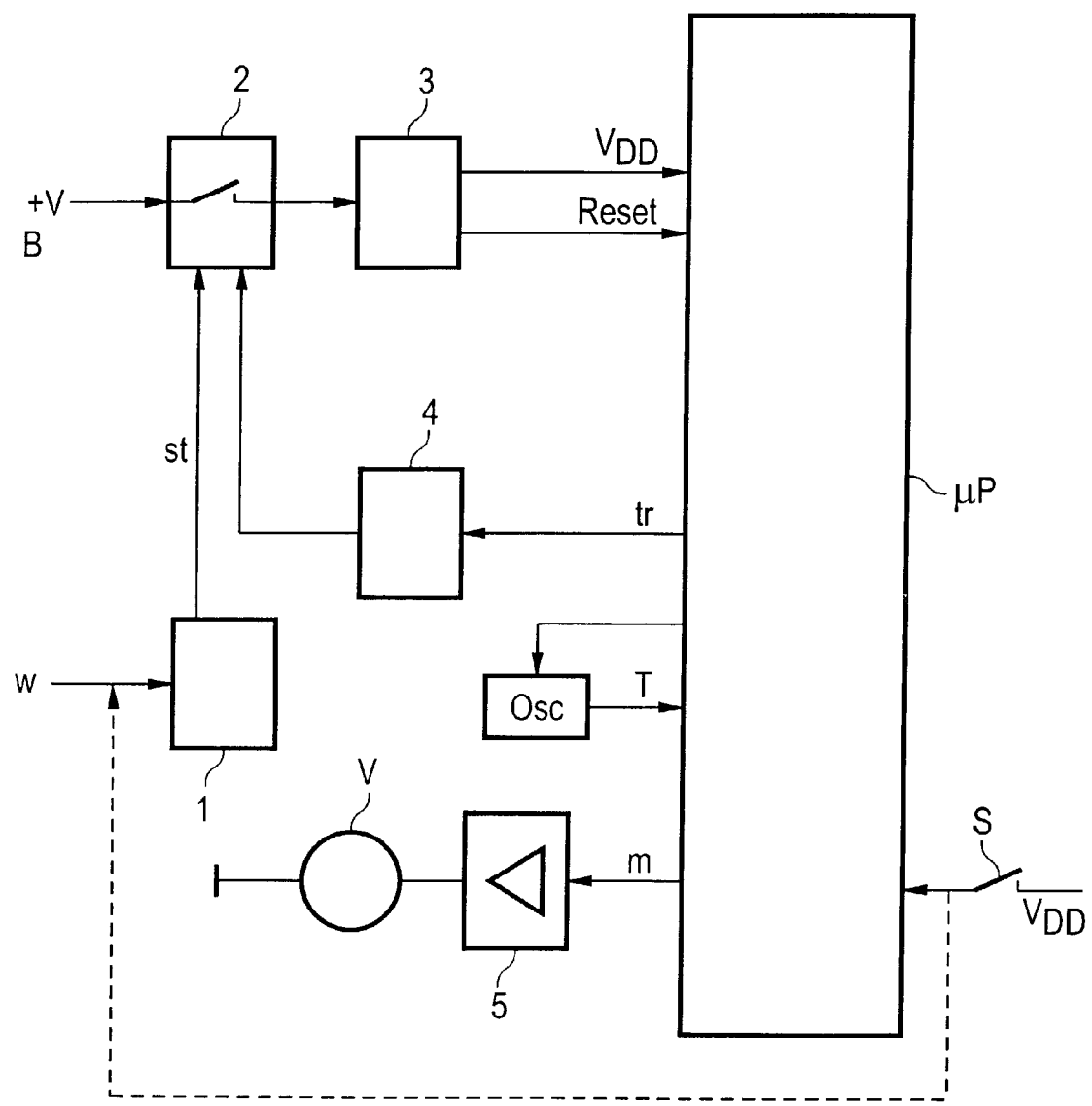

CONTROL UNIT FOR A LOAD

CROSS REFERENCE TO RELATED APPLICATION

This application claims foreign priority to German application number 10137578.6 filed Aug. 1, 2001.

BACKGROUND OF THE INVENTION

The invention relates to a control unit for a load, in particular, to a control unit comprising a microprocessor for controlling the load.

Control units for loads which execute various control functions, for example for drive motors of a sliding sunroof control in a vehicle, are predominantly equipped with microprocessors.

The invention is based on the object of designing such a control unit equipped with at least one microprocessor in such a way that it consumes as little quiescent current as possible and that the load is not damaged in the event of a fault in the microprocessor or the environment thereof.

SUMMARY OF THE INVENTION

This object is achieved according to the invention by a control unit for a load, in particular for a sliding sunroof control of a vehicle, comprising a microprocessor, an integrated voltage regulator for generating the supply voltage of the microprocessor from the battery voltage of an on-board battery, a switching element which is arranged between the on-board battery and the voltage regulator, an input having wake-up capability, to which a wake-up pulse can be fed for the switch-on of the microprocessor, and which thereupon switches on the switching element for a predetermined switch-on duration by means of a control signal, as a result of which the microprocessor is fed its supply voltage by the voltage converter for said predetermined switch-on duration, wherein the microprocessor outputs trigger signals as long as it is fed its supply voltage and an oscillator assigned to it generates a processor clock signal, and a dynamic link, which maintains the switching state of the switching element as long as trigger signals are fed to it.

A wake-up pulse can be generated when the switch for the load is actuated. The load can be a sliding sunroof of a vehicle and the wake-up pulse may be generated when the vehicle is opened by means of remote control, when the ignition of the vehicle is switched on, or when the switch for the sliding sunroof control is actuated.

A method of operating a microprocessor for controlling a device according to the present invention comprises the steps of:

providing a power source;

coupling the power source for a predetermined time with the microprocessor upon activation of a wake-up signal;

executing a program in the microprocessor which activates the device and which during execution extends the predetermined time thereby coupling the power source with the microprocessor.

The power source can be further coupled for the predetermined time with an oscillator for supplying a clock signal for the microprocessor. The wake-up signal can be generated when the switch for the device is actuated. The method can be used for a sliding sunroof control of a vehicle, wherein the wake-up pulse is generated when the vehicle is opened by means of remote control, when the ignition of the vehicle is switched on, or when the switch for the sliding sunroof control is actuated.

Another embodiment according to the present invention is a control unit for a load comprising a microprocessor comprising first output for controlling the load and a second output, a power supply unit, a switching element which is arranged between the power supply and the microprocessor, a wake-up circuit controlling the switching element, wherein the wake-up circuit activates the switching element for a predetermined time upon receipt of an input signal, and a dynamic link comprising an input coupled with the second output and an output for controlling the switching element.

The wake-up circuit and/or the dynamic link can be a monostable multivibrator. The control unit can further comprise an oscillator for supplying a clock signal for the microprocessor and a voltage regulator coupled between the switch and the microprocessor. The voltage regulator may comprises a reset output coupled with a reset input of the microprocessor. The control unit can further comprise a key switch for generating the wake-up signal. The key switch may comprise an input coupled with the power supply unit and an output coupled with an input of the microprocessor, wherein the input of the microprocessor is coupled with an input of the wake-up circuit.

The essential feature according to the invention is the use of a voltage regulator which is switched on and off by means of a switching element whose switch-on state is ensured by dynamic link or inputs with wake-up capability. Associated with this is a dynamic self-latching of the switching element which is held in the switched-on state by periodic signals of the microprocessor.

In the fault situation, for example in the event of failure of the oscillator for generating clock signals which is required by the microprocessor, these periodic signals of the microprocessor are no longer output. The dynamic link ensures that the entire control is then turned off. After the turn-off, the microprocessor can be restarted, which ensures that it starts in a stable operating state.

BRIEF DESCRIPTION OF THE DRAWING

FIG. 1 shows an exemplary embodiment of the invention in more detail in form of a schematic drawing.

DETAILED DESCRIPTION OF THE PREFERRED EMBODIMENT

The exemplary embodiment relates only to the control of a sliding sunroof drive motor, although the microprocessor can also perform various other control functions that are not of interest here, such as trapping protection, blocking protection, etc.

The single figure shows a microprocessor µP, from which drive signals m pass via a power output stage 5 to a load designed as sliding sunroof drive motor V.

The microprocessor µP receives its supply voltage $V_{DD}$ (generally 5 V) from an on-board battery (not illustrated; it outputs for example a battery voltage $V_B$=12 V) via a switching element 2 and an integrated voltage regulator 3, which converts the battery voltage $V_B$ into the supply voltage $V_{DD}$ and regulates it. The voltage regulator 3 also supplies the microprocessor µP with a reset signal "Reset", in order to ensure a controlled start-up and turn-off.

The microprocessor µP is supplied with the required control clock signal T by an external or internal oscillator Osc.

When the switch S for the sliding sunroof control is actuated (this case is indicated by a dashed arrow in the figure), a wake-up pulse w is generated in order to wake up the microprocessor µP, i.e. put it into an operational state. In this case, with the sliding sunroof not actuated, quiescent current does not flow, but rather only operating current. However, a wake-up pulse w can also be generated when the vehicle is opened by means of a remote control, or when the ignition is switched on. A small quiescent current then also flows with the sliding sunroof not actuated.

The wake-up pulse w passes to an input 1 with so-called "wake-up capability", which thereupon outputs a control signal st of a specific duration, which puts the switching element 2 into the switch-on state for said specific duration. The input with wake-up capability operates for example like a monostable multivibrator.

The switch-on of the switching element 2 activates the voltage regulator 3, as a result of which the supply voltage $V_{DD}$ is applied to the microprocessor µP and it thus becomes ready for operation. The oscillator begins to operate and supplies the microprocessor µP with the required control clock signal T, whereupon the latter outputs periodic trigger signals tr to a circuit 4 called a "dynamic coupling", which begin within the duration of the control signal st and hold the switching element 2 in the switched-on state.

When the switch S is switched on, the microprocessor µP begins to process a program intended for the actuation of the drive motor V and outputs a drive signal m to the power output stage 5, as a result of which the sliding sunroof drive motor V is set in motion. Other programs, for example for trapping protection, or blocking protection, etc., begin to operate at the same time.

In the case where the microprocessor µP then suddenly stops working, for example if the crystal of the oscillator Osc breaks, then in the absence of protective measures, the currently output command (in this case the command "motor run") would remain and the sliding sunroof drive motor V would become scorched in a short time since blocking protection would then also no longer be present.

According to the invention, however, if the oscillator Osc stops operating, no trigger signals tr are output by the microprocessor µP, as a result of which the switch-on state of the switching element 2 is not maintained any longer via the dynamic coupling. It is switched off, as a result of which the supply voltage is removed from the microprocessor µP. As a result, the drive signal m for the sliding sunroof drive motor V also disappears and said motor thereupon stops immediately. A hazardous state for the sliding sunroof drive motor V can no longer arise. Moreover, there is no longer a risk due to the motor otherwise being driven in an uncontrolled manner.

In the case where a different fault stops the microprocessor µP, it can be brought to a safe operating state again by a restart. In the case of damage to the oscillator, in the event of a renewed wake-up pulse w, although the switching element 2 would be switched on, it would immediately be switched off again with the trigger signals tr failing to appear, so that a repair would be essential in this case.

What is claimed is:

1. A control unit for a load, said control unit comprising:
    a microprocessor,
    an integrated voltage regulator for generating the supply voltage of the microprocessor from a battery voltage of an on-board battery,
    a switching element which is arranged between the on-board battery and the voltage regulator,
    an input having wake-up capability, to which a wake-up pulse can be fed for the switch-on of the microprocessor, and which thereupon switches on the switching element for a predetermined switch-on duration by means of a control signal, as a result of which the microprocessor is fed a supply voltage by the voltage regulator for said predetermined switch-on duration, wherein the microprocessor outputs trigger signals as long as the microprocessor is fed a supply voltage and an oscillator assigned to the microprocessor generates a processor clock signal, and
    a coupling circuit, which maintains the switching state of the switching element as long as trigger signals are fed to said coupling circuit.

2. A control unit as claimed in claim 1, wherein a wake-up pulse is generated when the switch for the load is actuated.

3. A control unit for a sliding sunroof control of a vehicle as claimed in claim 1, wherein a wake-up pulse is generated when the vehicle is opened by means of remote control.

4. A control unit for a sliding sunroof control of a vehicle as claimed in claim 1, wherein a wake-up pulse is generated when the ignition of the vehicle is switched on.

5. A control unit for a sliding sunroof control of a vehicle as claimed in claim 1, wherein a wake-up pulse is generated when the switch for the sliding sunroof control is actuated.

6. A control unit for a load, said unit comprising:
    a microprocessor comprising a first output for controlling the load and a second output for transmitting trigger signals,
    an oscillator for supplying a clock signal for the microprocessor,
    a power supply unit,
    a switching element which is arranged between the power supply and the microprocessor,
    a wake-up circuit controlling the switching element, wherein the wake-up circuit activates the switching element for a predetermined time upon receipt of an input signal, and
    a dynamic link comprising an input coupled with the second output of the microprocessor and an output for controlling the switching element.

7. The control unit as in claim 6, wherein the wake-up circuit is a monostable multivibrator.

8. A control unit as in claim 6, wherein the dynamic link is a monostable multivibrator.

9. A control unit as in claim 6, further comprising a voltage regulator coupled between the switch and the microprocessor.

10. A control unit as in claim 9, wherein the voltage regulator comprises a reset output coupled with a reset input of the microprocessor.

11. A control unit as in claim 6, further comprising a key switch for generating the wake-up pulse.

12. The control unit as in claim 11, wherein the key switch comprises an input coupled with the power supply unit and an output coupled with an input of the microprocessor and wherein the input of the microprocessor is coupled with an input of the wake-up circuit.

* * * * *